(12) United States Patent
Ferreira

(10) Patent No.: US 6,543,501 B2
(45) Date of Patent: Apr. 8, 2003

(54) TRACTION ASSEMBLY FOR VEHICLES

(76) Inventor: John A. Ferreira, 3177 W. Cartmill, Tulare, CA (US) 93274

(*) Notice: Subject to any disclaimer, the term of this patent is extended or adjusted under 35 U.S.C. 154(b) by 0 days.

(21) Appl. No.: 09/927,622

(22) Filed: Aug. 9, 2001

(65) Prior Publication Data

US 2003/0029538 A1 Feb. 13, 2003

(51) Int. Cl.$^7$ .............................................. B60C 11/00
(52) U.S. Cl. ..................................... 152/225 R; 152/226
(58) Field of Search ............................ 152/226, 225 R, 152/223, 224; 305/185, 200

(56) References Cited

U.S. PATENT DOCUMENTS

| | | | | |
|---|---|---|---|---|
| 841,473 A | * | 1/1907 | Weaver | 152/225 R |
| 1,114,983 A | * | 10/1914 | Grisingher | 152/225 R |
| 1,237,274 A | * | 8/1917 | Bacon | 152/225 R |
| 1,515,592 A | * | 11/1924 | Davies | 152/225 R |
| 3,002,545 A | * | 10/1961 | Newcomb | 152/225 R |
| 3,737,001 A | | 6/1973 | Rasenberger | |
| 3,863,726 A | | 2/1975 | O'Brien et al. | |
| 3,921,743 A | | 11/1975 | Parrish | |
| 4,089,359 A | * | 5/1978 | Jones | 152/225 R |
| 4,834,158 A | * | 5/1989 | Katz | 152/225 R |
| 6,338,373 B1 | * | 1/2002 | Forbes et al. | 152/255 R |

OTHER PUBLICATIONS

Mattracks—Worldwide Track Technology, by Mattracks, Inc. (Aug. 2001).

* cited by examiner

Primary Examiner—S. Joseph Morano
Assistant Examiner—Long Bao Nguyen
(74) Attorney, Agent, or Firm—Richard A. Ryan

(57) ABSTRACT

A traction assembly for single and dual-wheeled vehicles that is easy to install and suitable for storing in the vehicle when not in use having a plurality of spaced apart traction units interconnected by a connector and locked into place with a securing mechanism. Each traction unit includes a pair of spaced apart traction bars that are interconnected by a spacer member. Preferably, the traction bars are L-shaped angle irons and the spacer member is a V-shaped angle iron connected to two adjacent traction bars. A generally elongated, flexible connecting member interconnects the traction units and allows the assembly to be folded or collapsed. A securing mechanism connects the opposing ends of the traction assembly to secure the assembly around the wheel or wheels.

19 Claims, 2 Drawing Sheets

TRACTION ASSEMBLY FOR VEHICLES

BACKGROUND OF THE INVENTION

A. Field of the Invention

The present invention relates generally to traction assemblies for converting a wheeled driven vehicle, such as a truck, into a track-like driven vehicle for improved traction in certain types of terrain and driving conditions. In particular, this invention relates to such traction assemblies that easily and effectively improve the traction of such vehicles, including dual-wheeled driven vehicles.

B. Background

It is well known that many people drive their vehicles, including trucks, cars and other types of vehicles, through all types of terrain and road (or non-road) conditions. Whether for work, leisure enjoyment or of out of necessity, vehicles are driven through sand, mud, gravel, snow, ice and other types of difficult driving conditions (collectively referred to as "adverse conditions"). This includes driving the vehicle on or to the beach through sand, through a rain-soaked dirt road that has become muddy, and through the snow and ice to get to the driver's home or favorite ski or snow play destination. Although these adverse conditions vary somewhat from each other, they all have in common a lack of traction for the typical motor vehicle having standard wheels and tires. The lack of traction resulting from these adverse conditions can make travel across such ground virtually impossible. Attempting to cross such conditions can result in the vehicle becoming stuck, requiring the assistance of another driver or a tow truck to free the vehicle. Naturally, such loss of time and expense is not desirable. As a result, even the mere risk of becoming stuck discourages many drivers from attempting to take their vehicle through such adverse conditions.

To compensate for and attempt to overcome the lack of traction in the adverse conditions, many vehicles are equipped by the manufacturer with components to assist the driver. One common type of factory component is the use of four-wheel drive. Another component is the use of dual-wheel rear wheels (commonly known as dualies). These components do generally improve traction when driving through adverse conditions, particularly when used with the right type of tires, those which are configured and or adapted to grip the "road" better when driven on sand, mud or snow. However, no matter how well the vehicle or its tires are designed to handle loose or slippery driving conditions, virtually all vehicles still have difficultly driving through particularly adverse conditions, including thick, soft sand, deep snow and thick ice. In addition to the above factory components, various vehicle accessories are commonly available for use when driving in adverse conditions, including snow chains and the like. Although snow chains generally improve traction when used for snow or ice, they do not assist the driver who wants to take their vehicle across sand or muddy ground conditions. Therefore, while the above components and accessories do provide additional traction under certain conditions, they do not work well under other conditions (i.e., loose sand) and have certain limitations that are difficult to overcome, particularly with regard to dual-wheeled vehicles.

Several patents have issued for apparatuses to improve traction for wheeled vehicles when driving across adverse conditions. For instance, U.S. Pat. No. 3,921,743 to Parrish discloses a vehicle traction unit that attaches to a standard vehicle in place of the rear or all wheels. The traction unit of this patent comprises a frame member that is clamped to the vehicle with a plurality of load bearing wheels and drive sprocket wheels on the frame member and an endless track belt around the load and drive wheels forming a track system (i.e., similar to a tank) to convert a truck to a "half-track" or "full-track" vehicle. Another patent is U.S. Pat. No. 3,863,726 to O'Brien, which discloses a tracked drive for vehicles that mounts to the rear axle of a wheeled vehicle to convert it to a snowmobile-like vehicle. This tracked drive unit has an ground-engaging track mounted on a housing having sprocket means for connecting to the track and to the axle of the vehicle. Another patent is U.S. Pat. No. 3,737,001 to Rasenberger, which discloses a track assembly to convert wheeled vehicles into a tracked vehicle. The assembly comprises a frame having at least two support arms connected to the drive assembly with a pair of endless tracks about the frame. Each of the above patents disclose an apparatus for converting a vehicle, such as a truck, to at least a half-track vehicle having endless tracks that interact with the ground surface to provide improved traction for the vehicle. As is well known, half-track type vehicles are generally much slower and more difficult to operate. As a general rule, the conversion from a regular wheeled vehicle to a half-track vehicle should only be done at the point in time and location when the additional traction is needed (as opposed to full-time usage). Each of these patents disclose an apparatus that requires complete removal of at least the rear wheels of the vehicle so as to replace the wheels with the track assembly or apparatus. The removal of the wheels and replacement with the track assembly is a difficult and time consuming process that is not lightly undertaken. In addition, the track assemblies themselves appear to be relatively expensive to make and are obviously much too cumbersome to carry around in the vehicle so that they may be placed on the vehicle only when needed. As a result, use of apparatuses such as those disclosed in the above patents have not had much acceptance for most drivers, particularly those only requiring improved traction on a limited or occasional basis.

The known existing art show that the broad concept of improving the traction of a standard vehicle for use in adverse conditions is well known. On the other hand, none of the known references, whether individually or in all appropriate combinations, teach a relatively inexpensive, easy to install and effective assembly for improving traction that is suitable for mounting on a standard vehicle, including those having dual rear wheels. Specifically, the known prior art does not disclose a traction assembly for single or dual-wheeled vehicles that is configured to be installed on the vehicle with the wheels in place. What is needed is a traction assembly that is suitable for use on single and dual-wheeled vehicles that does not require removal of the wheels and which is relatively easy and quick to install.

SUMMARY OF THE INVENTION

The traction assembly for dual-wheeled vehicles of the present invention provides the benefits and solves the problems identified above. That is to say, the present invention discloses a traction assembly that can be installed directly on the wheels of a single-wheeled vehicle (i.e., vehicles having a single wheel at the ends of the rear axle) or dual-wheeled vehicle (i.e., vehicles having two wheels at the ends of the rear axle) without requiring removal of the wheels from the vehicle. The traction assembly of the present invention is relatively inexpensive to make and easy to install. In addition, the present traction assembly can be folded or rolled up into a relatively small package that is suitable for carrying in the vehicle so that the driver can attach the assembly to the vehicle for improved traction only when such traction is necessary.

In its broadest form, one embodiment of the present invention comprises a plurality of traction units that are interconnected by a connecting member and secured in place on the wheels of the single or dual-wheeled vehicle by a securing mechanism. Each of the traction units has a pair of spaced apart traction bars and at least one spacer member interconnecting the traction bars. The traction bars are configured to provide traction for the vehicle when the assembly is secured around the wheels. The spacer member is shaped and configured to be disposed alongside the tire of a single-wheeled vehicle or between the pair of wheels of a dual-wheeled vehicle when the assembly is securely installed on the vehicle. Once secured into place on the wheels, the traction assembly substantially improves the traction of the wheels against the ground, particularly when in sand and the like. Unlike prior art devices, removal of the wheels from the vehicle is not necessary for installation or removal of the traction assembly of the present invention. Instead, to install the traction assembly of the present invention, the user merely lays out the assembly on the ground, drives on top of the assembly, pulls the ends of the assembly up around the wheels and securely connects the ends together.

In the preferred embodiment, the present invention has traction bars that are generally L-shaped members, such as L-shaped angle irons, and the spacer members are generally V-shaped members, such as V-shaped angle irons. One side of the L-shaped member is flat and will lie against the wheels of the vehicle when the assembly is secured to the wheels. The other side of the L-shaped member protrudes or extends outwardly from the wheels to dig into the sand, mud or other adverse condition to provide improved traction for the vehicle. The sides of the V-shaped member can abut the sides of the tires so as to position the pair of connecting members along the sides of the wheels (for a single-wheeled vehicle) or position the single connecting member generally in the center of the space between the wheels (for a dual-wheeled vehicle). Also in the preferred embodiment, the traction bars are generally parallel to each other and approximately the same width as the wheel or dual wheels and each of the spacer members are generally perpendicular to the traction bars. The connecting member of the preferred embodiment is generally longitudinally shaped, flexible and collapsible to facilitate the folding and storage of the assembly when it is not in use. The securing mechanism can be one of a variety of devices that are capable of securing two ends of a chain or other connecting member together. In the preferred embodiment, a chain binder is utilized to pull the ends together and a clevis is used to connect the ends. The traction bars and spacer member making up the traction unit can be integral, thereby eliminating the need to attach the separate pieces together.

Accordingly, the primary objective of the present invention is to provide a traction assembly for single and dual-wheeled vehicles that is relatively inexpensive to make, easy to install and effective for improving traction in adverse conditions.

It is also an important objective of the present invention to provide a traction assembly that can be placed on a vehicle without requiring the removal of the wheel or wheel assembly from the vehicle.

It is also an important objective of the present invention to provide a traction assembly that utilizes a plurality of traction units interconnected by a connecting member and having a securing mechanism to securely mount the assembly on the wheels of a vehicle.

It is also an important objective of the present invention to provide a traction assembly that utilizes components that are relatively commonly and inexpensively available, such as L-shaped and V-shaped angle irons, chains and clevis.

The above and other objectives of the present invention will be explained in greater detail by reference to the figures and the description of the preferred embodiment which follows. As set forth herein, the present invention resides in the novel features of form, construction, mode of operation and combination of parts presently described and understood by the claims.

BRIEF DESCRIPTION OF THE DRAWINGS

In the drawings which illustrate the best modes presently contemplated for carrying out the present invention.

DETAILED DESCRIPTION OF THE PREFERRED EMBODIMENTS

With reference to the figures where like elements have been given like numerical designations to facilitate the reader's understanding of the present invention, and particularly with reference to the embodiment of the present invention illustrated in FIGS. 1 through 4, the preferred embodiment of the present invention is set forth below. The enclosed figures and drawings are merely illustrative of the preferred embodiments and represent several different ways of configuring the present invention. Although specific components, materials, configurations and uses are illustrated, it should be understood that a number of variations to the components and to the configuration of those components described herein and in the accompanying figures can be made without changing the scope and function of the invention set forth herein.

Figure 1:
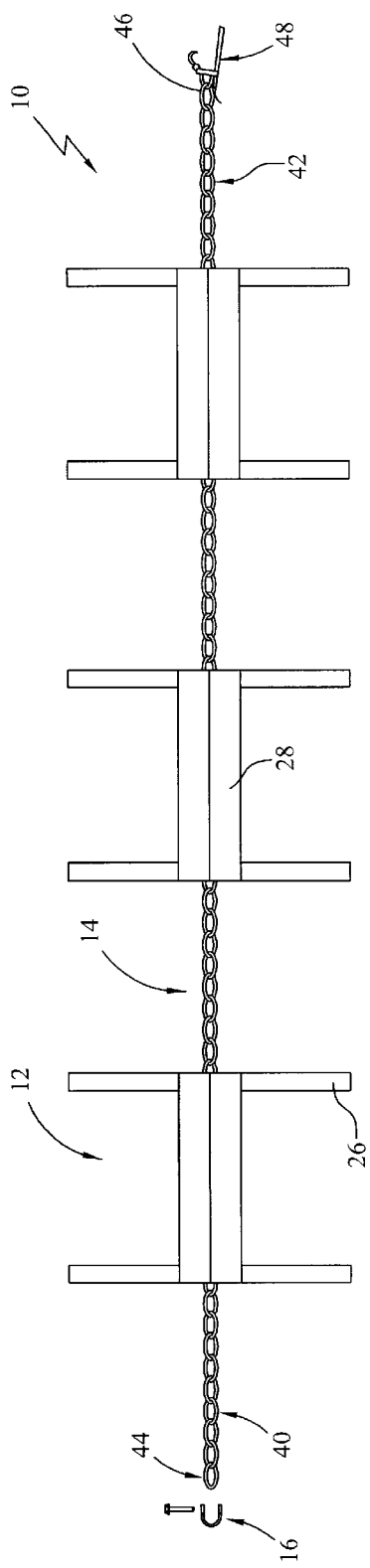
FIG. 1 is a plan view of the present invention configured for a dual-wheeled vehicle.
Figure 3:
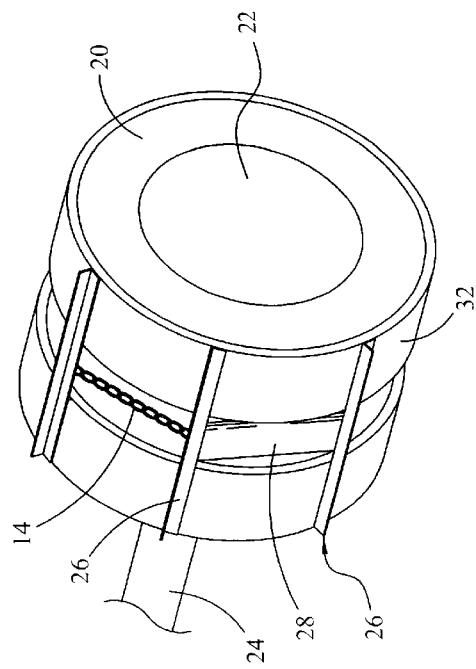
FIG. 3 a perspective view of the present invention mounted on the dual-wheels of a dual-wheeled vehicle.

The traction assembly for dual-wheeled vehicles of the present invention is shown generally as 10 in FIGS. 1 and 3. As described in more detail below and best shown in FIG. 1, the principal components of the present invention are the plurality of traction units 12, the connecting members 14 and the securing mechanism 16. These components work together to vastly improve the traction of a dual-wheeled vehicle (not shown) generally having at least two pairs of dual wheels 18 on the vehicle, as shown in FIG. 3. Typically, dual-wheeled vehicles have the pair of wheels 18 at the ends of the rear axle of the vehicle. For purposes of describing the present invention, the term wheel refers to the combination of tire 20 on the center wheel 22 which are operatively attached to the vehicle's axle 24. Unlike the known prior art devices, traction assembly 10 of the present invention does not require removal of any of wheels 18 from the vehicle. Instead, as explained in more detail below, traction assembly 10 is placed on the wheels 18 much like typical snow chains are placed around a tire. In addition, when configured in its preferred configuration, the traction assembly of the present invention can collapse or fold down to a relatively small size that is suitable for carrying in the vehicle and being stored therein until needed to drive across adverse conditions (such as sand).

Figure 2:
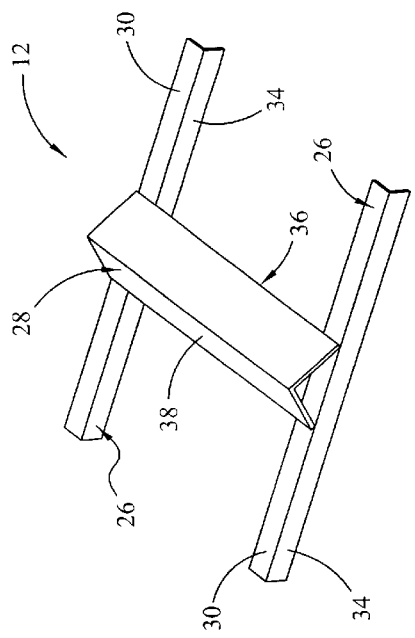
FIG. 2 is a perspective view of the traction unit of the embodiment of the present invention shown in FIG. 1.

In the preferred embodiment, traction unit 12 comprises a pair of spaced apart traction bars 26 interconnected by spacer member 28, as best shown in FIG. 2. Traction bars 26 are designed and configured to improve the traction of the vehicle when traction assembly 10 is installed on wheels 18. Spacer member 28 connects the two traction bars 26 to form the traction unit 12. In the preferred embodiment, the pair of traction bars 26 are substantially parallel to each other and the spacer member 28 is substantially perpendicular to the traction bars. In one configuration, traction bars 26 are L-shaped angle irons that are configured into traction unit 12 such that when the traction assembly 10 is placed around wheels 18, the first side 30 is in a plane substantially adjacent to that of the outer surface 32 of wheels 18 and second side 34 protrudes from that plane at an approximate 90 degree angle to provide traction by digging into the sand, mud or other adverse condition. Other angles can also provide the traction necessary for the present invention. In the configuration shown in the attached figures, spacer member 28 is also a V-shaped angle iron that is connected at its ends to the first side 30 of traction bars 26. As best shown in FIG. 2, spacer member 28 is placed in traction unit 12 such that it forms an upside down V-shape with its outer end edges 36 against first side 30 of traction bar 26. Both traction bar 26 and spacer member 28 can be made out of steel or other materials that are sufficiently strong enough to function as described herein. If made out of steel, spacer member 28 can be welded or otherwise connected to traction bar 26 by various methods well known in the art.

Traction assembly 10 should be configured such that first side 30 of traction bars 26 is placed against tire 20 of wheels 18 so that traction assembly 10 will rotate as a single unit with wheels 18. Second side 34 of traction bars 26 should protrude or extend outwardly from first side 30 and the surface of tire 20 a sufficient distance to provide the traction necessary for wheels 18 to drive the vehicle across or through the adverse conditions. Additionally, in the preferred embodiment, the width of traction bar 26 is substantially equal to the width across wheels 18 so that the entire tire surface 32 has the benefit of the improved traction. In one configuration of traction unit 12, which the inventor has found to work well in sand conditions with 7.50R16LT radial tires sold under the brand name Daytona Radial Stag, traction assembly 10 utilizes four traction units 12, each spaced approximately eleven inches apart. Each traction unit 12 has elongated traction bars 26 that are approximately sixteen inches long having a first side 30 that is approximately one to two inches wide and second side 34 that is approximately one to two inches wide. The traction units also have an elongated spacer member 28 that is approximately twelve inches long and having sides 38 approximately two and one-half inches wide. Other dimensions and angles for either traction bars 26 or spacer member 28 can also provide sufficient traction for traction assembly 10. Care should be taken not to utilize a traction bar 26 having a second side 34 being too long (i.e., extending too much from surface 32 of tire 20) such that the traction assembly 20 buries itself in the sand or mud and requires too much torque from the vehicle to sufficiently turn the vehicle's wheels 18.

Connecting members 14 are disposed between adjacent traction units 12 to connect the plurality of traction units 12 together to form traction assembly 10, as best shown in FIG. 1. In one embodiment, connecting member 14 comprises a plurality of individual chain or chain-like members that are attached at their ends to traction bars 26 by the use of welding and/or various connectors (bolts, rivets, screws, etc.) that would be suitable for securely attaching connecting member 14 to traction bars 26. Additional chain sections can be utilized to form first end section 40 and second end section 42 at the opposite ends of traction assembly 10. Alternatively, connecting member 14 can be a single long chain that runs the entire length of traction assembly 10 that is welded or otherwise connected to traction bars 26 and/or to spacer member 28. In this configuration, connecting member 14 can also or alternatively be welded to the bottom of the V-shape for the spacer member 28 (i.e., opposite ends 36 of spacer member). Also in this configuration, connecting member 14 can form end sections 40 and 42 of traction assembly 10. As set forth below, end sections 40 and 42 are securely joined together to form the complete traction assembly 10 around wheels 18. Alternatively, only a single end section (i.e., either 40 or 42) can be utilized, with the single end section 40 or 42 connecting to the traction bar 26 or spacer member 28 of the adjacent traction unit 12

As best shown in FIG. 1, when laid out on the ground the traction assembly 10 of the preferred embodiment of the present invention is a generally elongated shape with first end 44 at the end of first end section 40 and second end 46 at the end of second end section 42. To attach to wheels 18 so that assembly 10 will properly function, first end 44 and second end 46 must be joined together (in the embodiment shown in FIG. 1). As known to those familiar with joining chains together, ends 44 and 46 can be joined in a variety of ways using a securing mechanism 16. In the embodiment shown in FIG. 1, ends 44 and 46 are connected together with a clevis as the securing mechanism 16. The two ends 44 and 46 can be pulled tightly together using a small chain binder 48 so that the clevis or other securing mechanism 16 can be connected around the wheels 18. The use of a chain binder has the advantage of making it easier to pull ends 44 and 46 together. As an alternative, the ends 44 and 46 can connect together using a quick-release type of connector, such as those used by mountain climbers and others. In addition, securing mechanism can be a U-bolt that is bolted down to connect ends 44 and 46 together. As discussed above, one of the end sections 40 or 42 could be eliminated and the end 44 or 46 of the remaining end section can connect directly to the opposing end traction unit 12 using commonly available connectors.

In use, the traction assembly 10 of the present invention is laid out on the ground either behind or in front of the dual-wheels to which it will be attached. The assembly 10 is laid on the ground such that second side 34 of traction bar 26 is facing downward, towards the ground and first side 30 and spacer member 28 are above the ground, as shown in FIG. 1. The laid out traction assembly 10 should be positioned so the spacer member 28 will be between the two tires 20 of wheels 18 and the ends of traction bar 26 are approximately at the outer edges of wheels 18. The vehicle is then backed-up or driven forward, depending on where the assembly 10 is laid out, so wheels 18 are driven on top of traction assembly 10 on either side of spacer member 28. The end sections 40 and 42 are then pulled up on either side of wheels 18 and ends 44 and 46 are connected together by securing mechanism 16, using a chain binder 48 or other apparatus to pull the ends 44 and 46 together (if desired). The ends 44 and 46 should be connected so that first side 30 of traction bar 26 abuts surface 32 of tires 20 and traction assembly 10 is tightly against wheels 18. The sides 38 of spacer member 28 will position connecting members 14 between the tires 20 of wheels 18. When the vehicle's engine is engaged, wheels 18 will begin to rotate, causing second side 34 of traction bars 26 to dig into the sand (or like) and allow the wheels 18 to grip the otherwise loose or difficult material. The vehicle can then be driven through the adverse conditions without wheels 18 slipping or the vehicle becoming stuck. Once traction assembly 10 is no longer required, it can be removed by unsecuring ends 44 and 46, laying assembly 10 out flat on the ground, and then backing up or driving forward off the assembly 10. Unlike prior art devices, the traction assembly of the present invention can then be rolled or folded up and stored in the vehicle.

Figure 4:
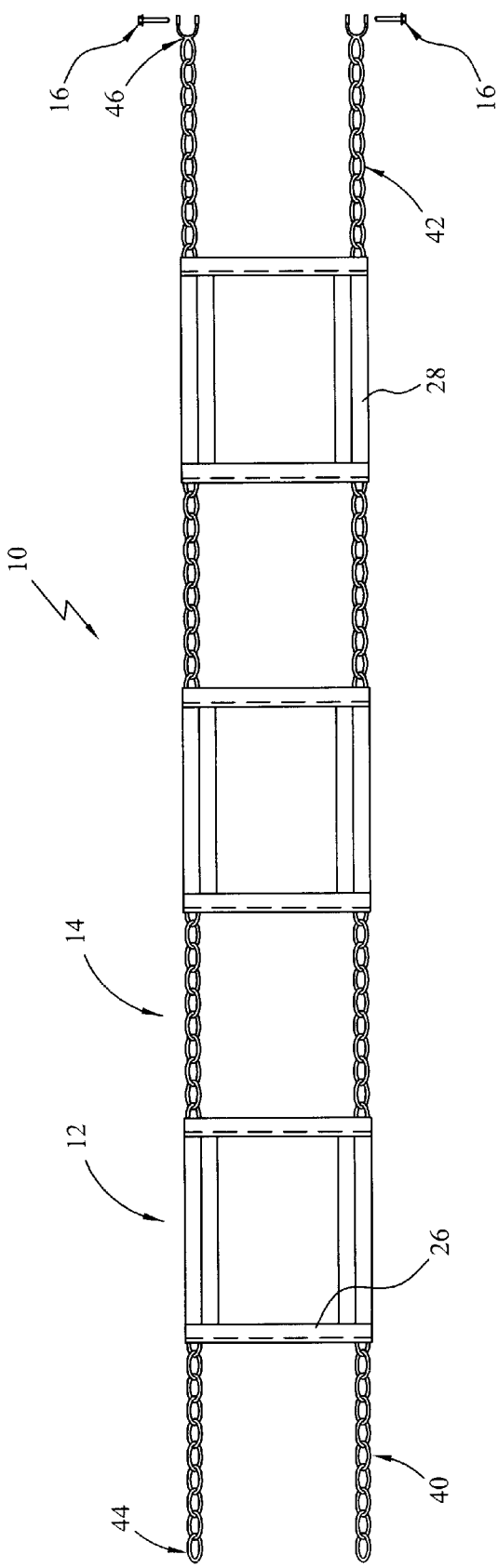
FIG. 4 is a plan view of the present invention configured for a single-wheeled vehicle.

As shown in FIG. 4, the present invention 10 can also be configured for installation on a single-wheeled vehicle (not shown) having at least one wheel. Typically, such vehicles will have one wheel at each end of the front and rear axles. As with the dual-wheeled configuration discussed above, the single-wheeled configuration comprises a plurality of traction units 12 where the adjacent units 12 are connected together using one or more connecting members 14 and the secured around the wheel 18 with a securing mechanism 16, such as a clevis. In this configuration, the traction unit 12 has a pair of opposing traction bars 26 separated by two spacer members 28 to generally form a quadrilateral shaped unit 12. Adjacent traction units 12 are connected by a pair of chain segments as the connecting members 14 that connect to the ends of the two spacer members. The sizes of the various components of the single-wheeled embodiment of the present invention 10 is dependent upon the size of the wheel 18 on which it will be installed. In one such configuration, traction bars 26 are eight inches long having sides 30 and 34 approximately one to two inches wide and made out of an L-shaped member one-fourth of an inch thick and spacer members 28 are twelve inches long with similar sides and thickness as the traction bars.

The use of this embodiment is very similar to the use of the dual-wheeled embodiment described above. The assembly 10 is laid out in front of or behind the wheel 18 of the vehicle and the vehicle is driven forward or reverse on top of the assembly 10. The assembly is pulled around the wheel and, if needed or desired, a chain binder 48 is used to tightly pull the ends 44 and 46 together. A securing mechanism 16, such as a clevis, is then placed through ends 44 and 46 so as to securely connect them together. The assembly 10 should be placed around wheel 18 such that second side 34 of traction bar 26 generally protrudes outward from the outer surface of tire 32 so that it can be useful for gripping the sand or other difficult driving condition and the sides 38 of spacer member 28 generally abut wheel 18.

A number of alternative configurations are possible for traction assembly 10 of the present invention. For instance, traction unit 12 can be made into a single, integral piece having traction bar 26 and spacer member 28. Although not preferred, spacer member 28 could be an elongated, generally planar section of metal (as opposed to the V-shaped angle iron). Other shapes can also be used. The V-shaped configuration is preferred because sides 38 of spacer member 28 lay against the sides of tires 20 to position connecting members 14 at or near the center of the space between tires 20. In addition, spacer member 28 can be a flexible member that, when under tension after being installed on wheels 18, will securely hold traction bars 26 against wheels 18 while the vehicle is being driven. Another alternative configuration is to utilize a cable or other longitudinal, flexible members for connecting member 14. Alternatively, connecting members 14 can be a solid bar or other stiff members that interconnect the traction units 12. Such a configuration would have the disadvantage of not being easily folded or stored in the vehicle, unless pivoting or other allowance was made for connecting members 14. To further strengthen the connection of securing mechanism 16, a hook (not shown) can be used on the outside ends of the last traction units 12 that stretch across to the opposing traction unit to connect to a hole or other device thereon so as to provide a safety back-up for the securing mechanism 16 (i.e., similar to the safety chains that are used when towing trailers or the like behind a vehicle). With this safety system, if the securing mechanism were to fail, the safety system would prevent the traction assembly from flying off the vehicle.

While there is shown and described herein certain specific alternative forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to the dimensional relationships set forth herein and modifications in assembly, materials, size, shape, and use.

What is claimed is:

1. A traction assembly for use with a dual-wheeled vehicle having at least one pair of wheels, comprising:

a plurality of traction units, each of said traction units having a pair of spaced apart traction bars and at least one spacer member interconnecting said traction bars, said traction bars configured to provide traction for said vehicle when secured around said pair of wheels, said spacer member shaped and configured to be disposed between said pair of wheels when installed on said vehicle;

means for connecting an adjacent pair of said traction units to each other; and means for securing said traction units and connecting means around said pair of wheels.

2. The traction assembly according to claim 1, wherein each of said traction bars is an L-shaped member.

3. The traction assembly according to claim 1, wherein each of said spacer members is a V-shaped member.

4. The traction assembly according to claim 1, wherein said traction bar and said spacer member are integral.

5. The traction assembly according to claim 1, wherein each of said traction bars are generally parallel to each other.

6. The traction assembly according to claim 1, wherein each of said spacer members are generally perpendicular to said traction bars.

7. The traction assembly according to claim 1, wherein said traction bars are approximately the same width as said wheel.

8. The traction assembly according to claim 1, wherein said connecting means is generally longitudinally shaped and collapsible.

9. The traction assembly according to claim 1, wherein securing means comprises a clevis.

10. A traction assembly for use with a dual-wheeled vehicle having at least one pair of wheels, comprising:

a plurality of traction units, each of said traction units having a pair of spaced apart traction bars and at least one spacer member interconnecting said traction bars, said traction bars comprising an L-shaped member configured to provide traction for said vehicle when secured around said pair of wheels, said spacer member shaped and configured to be disposed between said pair of wheels when installed on said vehicle;

means for connecting an adjacent pair of said traction units to each other; and means for securing said traction units and connecting means around said pair of wheels.

11. The traction assembly according to claim 10, wherein each of said traction bars are generally parallel to each other and said spacer members are generally perpendicular to said traction bars.

12. The traction assembly according to claim 10, wherein each of said spacer members is a V-shaped member.

13. The traction assembly according to claim 10, wherein said traction bar and said spacer member are integral.

14. The traction assembly according to claim 10, wherein said traction bars are approximately the same width as said wheels.

15. The traction assembly according to claim 10, wherein said connecting means is generally longitudinally shaped and flexible.

16. A traction assembly for use with a dual-wheeled vehicle having at least one pair of wheels, comprising:
    a plurality of traction units, each of said traction units having a pair of spaced apart traction bars and at least one spacer member interconnecting said traction bars, said traction bars comprising an L-shaped member having a first side configured to abut said wheels and a second side configured to provide traction for said vehicle when said traction unit secured around said wheels, said spacer member generally V-shaped and configured to be disposed between said pair of wheels when installed on said vehicle;
    an elongated, flexible connector disposed between and connecting an adjacent pair of said traction units to each other; and
    means for securing said traction units and connecting means around said pair of wheels.

17. The traction assembly according to claim 16, wherein said securing means connects the ends of said connector together.

18. The traction assembly according to claim 16, wherein said traction bar and said spacer member are integral.

19. The traction assembly according to claim 16, wherein said traction bars are approximately the same width as said wheels.

* * * * *